(12) United States Patent
Yamashita et al.

(10) Patent No.: US 6,294,903 B1
(45) Date of Patent: Sep. 25, 2001

(54) SWITCHING POWER SUPPLY

(75) Inventors: Tetsuji Yamashita, Osaka; Yoshihiro Mori, Kyoto; Yuji Yamanishi, Osaka; Yoshiaki Hachiya, Shiga, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/546,507

(22) Filed: Apr. 11, 2000

(30) Foreign Application Priority Data

Apr. 15, 1999 (JP) .................................................. 11-107805

(51) Int. Cl.[7] .................................. G05F 1/40; H02M 5/42
(52) U.S. Cl. .............................. 323/282; 323/285; 363/89
(58) Field of Search ...................................... 323/282, 284, 323/285, 222; 363/20, 49, 56, 21, 97, 131, 89; 315/224

(56) References Cited

U.S. PATENT DOCUMENTS 5,852,550 * 12/1998 Majid et al. ............................ 363/21

FOREIGN PATENT DOCUMENTS

| 4-42771 | 2/1992 | (JP) . |
| 8-116665 | 5/1996 | (JP) . |
| 10-191625 | 7/1998 | (JP) . |

* cited by examiner

*Primary Examiner*—Rajnikant Patel
(74) *Attorney, Agent, or Firm*—Merchant & Gould P.C.

(57) ABSTRACT

A switching power supply of a step-down chopper system, which is capable of reducing power consumption and unused power supply to the output. A voltage supplied to an input main terminal is turned ON/OFF by a switching device controlled by a control circuit, and outputted to an output main terminal through a conversion circuit. An output voltage detecting circuit detects the output voltage at the output main terminal, and according to the state of the output voltage detected, a feedback circuit is controlled, so that the ON/OFF control over the switching device by the control circuit is paused (or stopped). Thus, the switching device oscillates or is paused (stopped) according to the output voltage.

10 Claims, 12 Drawing Sheets

SWITCHING POWER SUPPLY

FIELD OF THE INVENTION

The present invention relates to a non-insulating switching power supply of a step-down chopper system, particularly to a switching power supply of a step-down chopper system which requires a technology for reducing power consumption.

BACKGROUND OF THE INVENTION

Figure 11:
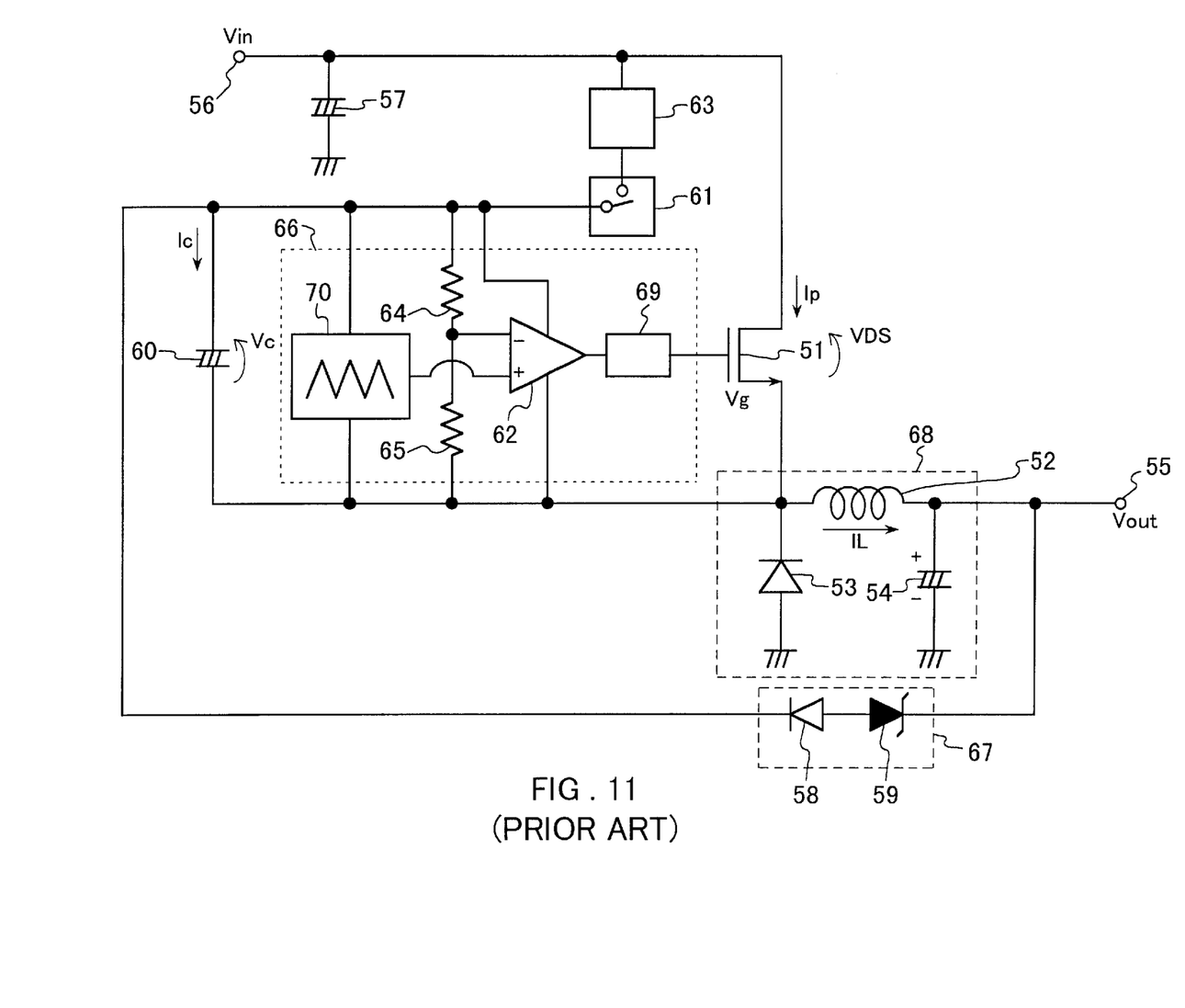
FIG. 11 is a circuit diagram showing a conventional switching power supply.

FIG. 11 is a circuit diagram showing a conventional switching power supply described in JP-A-10-191625. This circuit contains a switching device 51, a starting power supply block 63, a control circuit 66, a conversion circuit 68, and an output voltage detecting circuit 67 as main elements.

The switching device 51 comprises an n-channel MOS. An input main terminal 56 is connected to the drain terminal of the switching device. The input main terminal 56 is further connected to the anode terminal of an input capacitor 57 and to the starting power supply block 63.

The conversion circuit 68 includes a coil 52, a regeneration diode 53, and a capacitor 54. The anode terminal of the regeneration diode 53 is grounded. The node between the cathode terminal of the diode 53 and the coil 52 is connected to the source terminal of the switching device 51. The node between the other terminal of the coil 52 and the anode terminal of the output capacitor 54 is connected to the output main terminal 55.

The control circuit 66 comprises a PWM pulse forming circuit 69, a comparator 62, resistors 64 and 65, and a triangular wave forming circuit 70. The triangular wave forming circuit 70 forms a triangular wave carrier signal at a constant frequency (e.g. 100 kHz). The PWM pulse forming circuit 69 is connected to the gate terminal of the switching device 51. The control circuit 66 uses the voltage between both terminals of a capacitor for control circuit power supply 60 as its power supply voltage, and controls ON/OFF of the switching device 51 according to the change in the potential difference between both terminals of the capacitor 60. The control circuit 66 also is connected to the starting power supply block 63 through a power supply switching block 61.

The output voltage detecting circuit 67 comprises a diode 58 and a Zener diode 59. Its terminal at the side of the Zener diode 59 is connected to the output main terminal 55, and its terminal at the side of the diode 58 is connected to one terminal of the capacitor for control circuit power supply 60, respectively.

This conventional switching power supply circuit is a power supply circuit of a step-down chopper system, in which a DC voltage applied to the input main terminal 56 is stepped down and outputted from the output main terminal 55.

Figure 12:
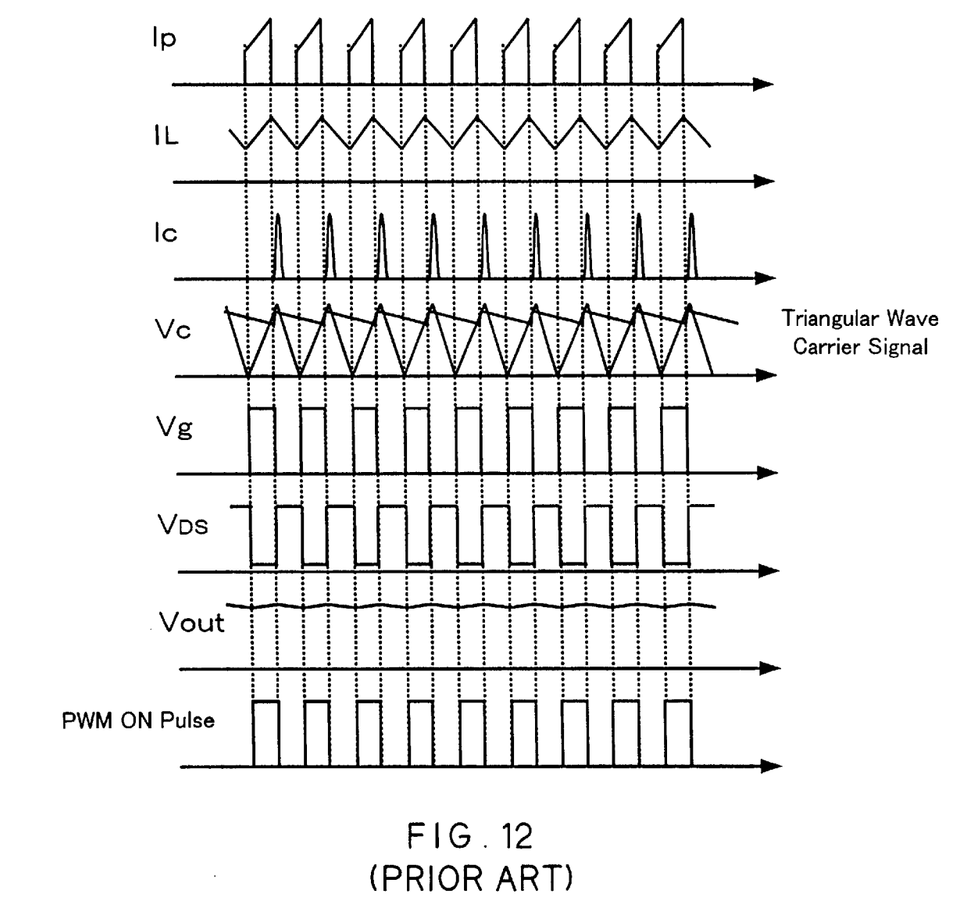
FIG. 12 shows operating waveforms at the respective parts of the switching power supply in FIG. 11.

FIG. 12 shows current/voltage waveforms at respective parts of the switching power supply in FIG. 11. The signs at the left of the waveforms in FIG. 12 correspond to the signs indicated at respective parts in FIG. 11. The power supply switching block 61 is closed so that the starting power supply block 63 is connected to the capacitor for control circuit power supply 60 until the control circuit 66 is started. When a voltage is applied to the input main terminal 56 first, a current flows from the starting power supply block 63 into the capacitor for control circuit power supply 60 through the power supply switching block 61, so that the voltage supplied to the control circuit 66 is increased.

The control circuit 66 operates when the supplied voltage exceeds a starting voltage of the control circuit 66. At this time, the output voltage Vout is 0 V. A triangular wave carrier signal voltage formed in the triangular wave forming circuit 70 and a voltage obtained by dividing the power supply voltage Vc of the control circuit 66 by the resistors 64 and 65 are compared by a comparator 62, and an output signal Vg indicated in FIG. 12 is supplied from the PWM pulse forming circuit 69 to the gate terminal of the switching device 51. The output signal Vg is ON for a certain duration. As described below, this duration is variable depending on the voltage between both terminals of the capacitor for control circuit power supply 60. When the output signal Vg is ON, the switching device 51 is ON, and a current Ip flowing in the switching device 51 flows into the coil 52. Next, when the switching device 51 is turned OFF by the output signal Vg of the control circuit 66, an electric energy accumulated in the coil 52 is supplied to the output through the regeneration diode 53.

If the voltage at the output main terminal 55 is increased to be greater than the sum of the puncture voltage Vz of the Zener diode 59, the forward voltage Vf of the diode 58, and the power supply voltage Vc of the control circuit 66 (Vz+Vf+Vc), when the switching device 51 is OFF, a current Ic flows from the output main terminal 55 into the capacitor for control circuit power supply 60 through the Zener diode 59 and the diode 58, so that information of the output voltage is fedback to the control circuit 66. When the power supply voltage Vc of the control circuit 66 becomes high enough, the supply switching block 61 switches so that the power supply voltage is supplied from the output main terminal 55 to the control circuit 66.

The triangular wave carrier signal voltage formed in the triangular wave forming circuit 70 and the voltage obtained by dividing the power supply voltage Vc of the control circuit 66 by the resistors 64 and 65 (or the power supply voltage Vc) are compared by the comparator 62, and on-duty of the switching device 51 in one triangular wave (1 carrier) is determined by the PWM pulse forming circuit 69, and then the pulse duration to be inputted to the switching device 51 is determined.

Thus, in the conventional switching power supply, by variably controlling the duty of the switching device 51, precision of the voltage at the output main terminal 55 is improved, and the output voltage Vout is kept constant.

In the conventional switching power supply circuit, pulse duration control system (PWM system) is used to improve the precision of the output voltage. Generally, the switching frequency fc is constant in this circuit, which is commonly 100 to 200 kHz. The PWM pulse forming circuit 69 determines the on-duty δ of the switching device 51, and allows it to operate at a constant frequency with minimum on-duty at the time of a light load.

However, when the above-mentioned conventional technology is used, the following problems occur. First, power is supplied to or consumed by the output main terminal uselessly because the switching device switches independently of the lightness or heaviness of the load. Second, switching loss is increased due to the relatively high switching frequency fc. In recent years, energy saving has been required from the point of energy or global environmental protection. Thus, a further reduction in power consumption and improvement in efficiency have been required in power supplies (primarily switching power supplies). However, because of the above two problems, a further reduction in power consumption and improvement in efficiency have been difficult to attain in a conventional control system.

SUMMARY OF THE INVENTION

The present invention intends to solve the above-mentioned two problems. It is an object of the present invention to provide a switching power supply with reduced power consumption and improved efficiency.

The switching power supply of the present invention includes: a switching device having an input terminal, an output terminal and a control terminal, which turns ON/OFF a first DC voltage supplied to the input terminal through an input main terminal, and outputs it to the output terminal; an input smoothing capacitor connected to the input main terminal; a starting power supply block connected to the input main terminal; a control circuit comprising an output signal terminal connected to the control terminal of the switching device, a power supply terminal connected to the starting power supply block through a power supply switching block, and a ground terminal connected to the output terminal of the switching device, the control circuit controlling ON/OFF of the switching device by inputting a signal from the output signal terminal; a capacitor for control circuit power supply whose one terminal is connected to the power supply terminal of the control circuit and whose other terminal is connected to the ground terminal of the control circuit; a conversion circuit connected to the output terminal of the switching device, which converts an output voltage turned ON/OFF by the switching device into a second DC voltage, whose absolute value is less than that of the first DC voltage, and outputs it to the output main terminal; an output voltage detecting circuit connected to the output main terminal; and a feedback circuit, which is supplied with an output signal of the output voltage detecting circuit, and controls the control circuit according to the signal. An intermittent ON/OFF control over the switching device by the control circuit is paused or stopped by an operation of the feedback circuit according to the state of the output main terminal.

It is preferable that the intermittent ON/OFF control over the switching device is paused or stopped according to the voltage at the output main terminal.

Furthermore, it is preferable that the period during which the intermittent ON/OFF control over the switching device is paused or stopped changes linearly with respect to the change in the voltage at the output main terminal.

According to the above-mentioned structure, operation of the switching device is controlled to include, although intermittent, a paused period, so that power consumption is reduced considerably. Moreover, by setting the switching frequency to be lower than the conventional value of 100 to 200 kHz, for example, 44 kHz or lower, the efficiency of the switching power supply can be improved because of reduced switching loss, and harmonic up to the third order also can be dealt with. Also, in order to obtain a stable paused state, the current (or voltage) level required to transform the state of the control circuit from operating to paused (or stopped), and the current (or voltage) level required to transform the state of the control circuit from paused (or stopped) to operating, are allowed to have hysteresis in the control circuit, the feedback circuit, or the output voltage detecting circuit. Thus, a more stable switching power supply is obtained.

Furthermore, it is preferable that the control circuit uses a reference voltage at a side that has a voltage higher than the reference voltage of the second DC voltage, and the output voltage detecting circuit detects the second DC voltage so as to control the feedback circuit.

The output voltage detecting circuit may comprise a serial circuit comprising at least a Zener diode and a light emitter element. Furthermore, the feedback circuit may comprise a switching element having at least a photo detector. Furthermore, the output voltage detecting circuit and the feedback circuit may comprise a Zener diode and a photocoupler.

Furthermore, it is preferable that the first DC voltage to be inputted is not lower than 100 V, and the second DC voltage to be outputted is not greater than 25 V Thus, in a switching power supply of low output (5 W or lower) in which a DC voltage of not lower than 100 V is converted into a DC voltage of not greater than 25 V, significant effects are obtained for cost reduction, size reduction, and improvement in performance.

Furthermore, it is preferable that the switching device and the control circuit are integrated on the same semiconductor substrate and incorporated into a package with at least four terminals, using at least four terminals including the input terminal and the output terminal of the switching device, a terminal for connecting the capacitor for control circuit power supply, and a terminal for connecting the feedback circuit, as external connecting terminals. According to this structure, parts count can be further reduced, so that a switching power supply with reduced size and lower cost can be obtained.

Furthermore, the control circuit may have a detecting terminal connected to the input terminal of the switching device.

Furthermore, it is preferable that the switching power supply of the present invention has overcurrent protection means. This prevents destruction of the switching device and protects the switching power supply from destruction.

Furthermore, it is preferable that the switching power supply of the present invention has overcurrent protection means and high temperature protection means. These prevent destruction of the switching device and protect the switching power supply from destruction.

DETAILED DESCRIPTION OF THE INVENTION

Preferred embodiments of the present invention are described below with reference to the drawings.

Figure 1:
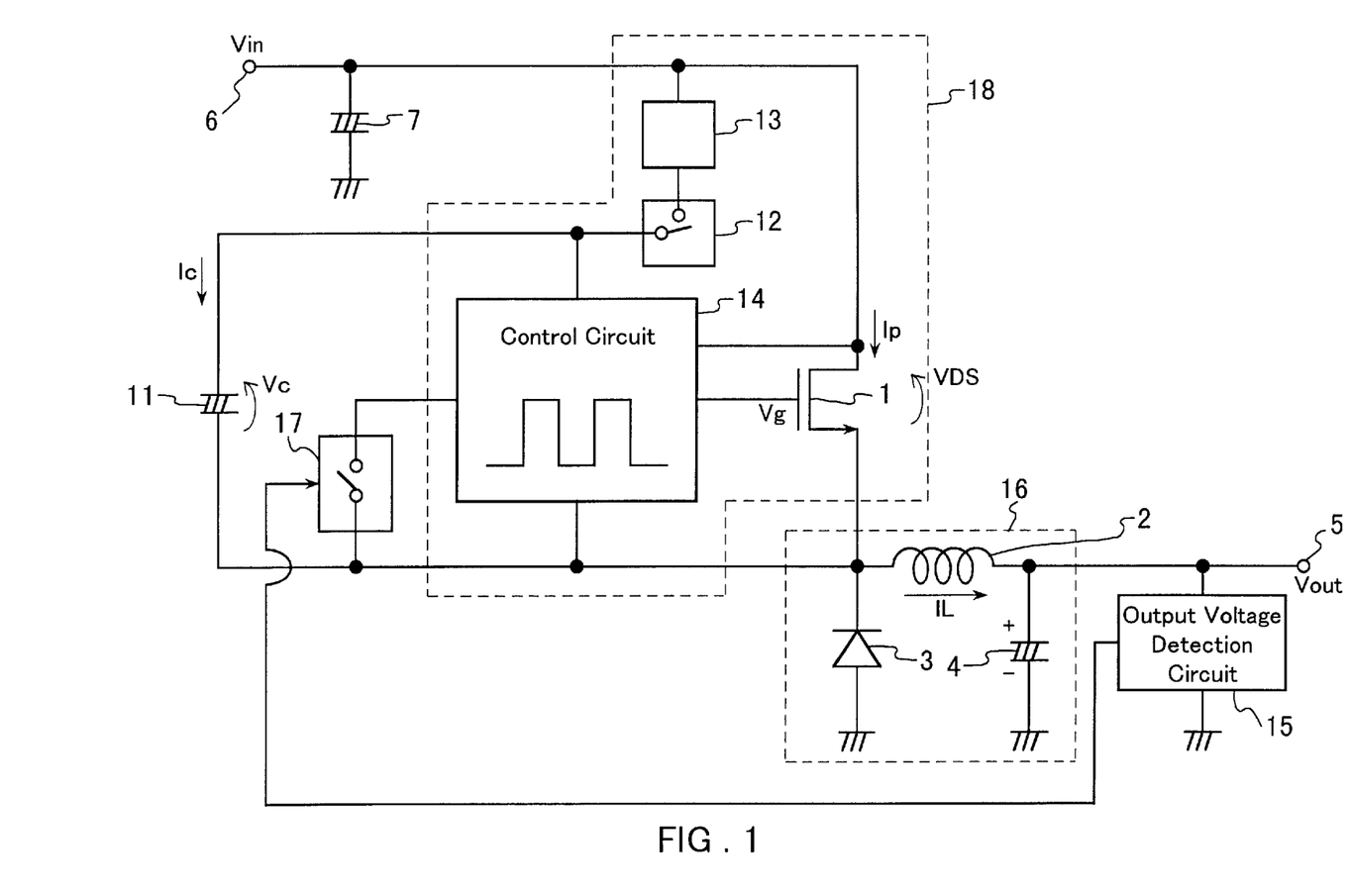
FIG. 1 is a circuit diagram showing a switching power supply of a first embodiment of the present invention.

FIG. 1 is a circuit diagram showing a switching power supply of the first embodiment of the present invention. This circuit includes a switching device 1, a starting power supply block 13, a control circuit 14, a conversion circuit 16, an output voltage detecting circuit 15, and a feedback circuit 17 as main elements.

The switching device 1 comprises an n-channel MOS. An input main terminal 6 is connected to the input terminal of the switching device 1, i.e. the drain terminal. The input main terminal 6 is further connected to the anode terminal of an input smoothing capacitor 7 and to the starting power supply block 13.

The conversion circuit 16 comprises a coil 2, a regeneration diode 3 through which a current regenerated by the coil 2 flows, and an output smoothing capacitor 4. The anode terminal of the regeneration diode 3 is grounded. The node between the cathode terminal of the diode 3 and the coil 2 is connected to the output terminal of the switching device 1, i.e. the source terminal. The node between the other terminal of the coil 2 and the anode terminal of the capacitor 4 is connected to the output main terminal 5. The conversion circuit 16 converts an output voltage of the switching device 1 into a DC voltage which is lower than a DC voltage applied to the input main terminal 6.

The output voltage detecting circuit 15 is connected to the output main terminal 5. The output signal of the output voltage detecting circuit 15 is inputted to the feedback circuit 17.

The output signal terminal of the control circuit 14 is connected to the control terminal of the switching device 1, i.e. the gate terminal. The period during which the switching device 1 is ON is kept constant by the control circuit 14.

The detecting terminal of the control circuit 14 is connected to the drain terminal of the switching device 1 so as to detect the ON voltage of the switching device 1. Therefore, the control circuit 14 has an overcurrent protection function using the ON resistance of the switching device 1 to detect an overcurrent level. In a period during which the switching device 1 is ON, a current of the overcurrent detection level always flows between the drain terminal and the source terminal of the switching device 1. On-duty of the switching device 1 is determined by the inductance of the coil 2 in the conversion circuit 16.

The period during which the switching device 1 can be ON is set in the control circuit 14, which is longer than a period during which the switching device 1 is ON as determined by the inductance of the coil 2.

The power supply terminal of the control circuit 14 is connected to one terminal (anode terminal) of the capacitor for control circuit power supply 11, and the ground terminal of the control circuit 14 is connected to the other terminal (cathode terminal) of the capacitor 11. The voltage of the capacitor 11 serves as the power supply voltage of the control circuit 14.

The anode terminal of the capacitor for control circuit power supply 11 is connected to the input main terminal 6 through the power supply switching block 12 and the starting power supply block 13. The cathode terminal of the capacitor 11 is connected to the source terminal of the switching device 1.

The feedback circuit 17 is controlled by the output signal of the output voltage detecting circuit 15, and allows the control circuit 14 to be in an operating state or in a paused state (or stopped state) according to the output signal of the output voltage detecting device 15. The ground terminal of the feedback circuit 17 is connected to the ground terminal of the control circuit 14 and to the cathode terminal of the capacitor for control circuit power supply 11.

Moreover, from a voltage applied to the input main terminal 6, the starting power supply block 13 generates a power supply voltage for control, and supplies it to the control circuit 14 through the power supply switching block 12. When the switching power supply starts normal operation, the power supply switching block 12 is switched so that the power supply voltage of the control circuit 14 is supplied from the capacitor 11. On the other hand, once the switching power supply starts operation, the power supply switching block 12 is switched ON or OFF so as to keep the voltage between both terminals of the capacitor for control circuit power supply 11 constant, and a current is supplied from the starting power supply block 13 to the capacitor for control circuit power supply 11.

The operation of the switching power supply with the above-mentioned structure is as follows.

Figure 2:
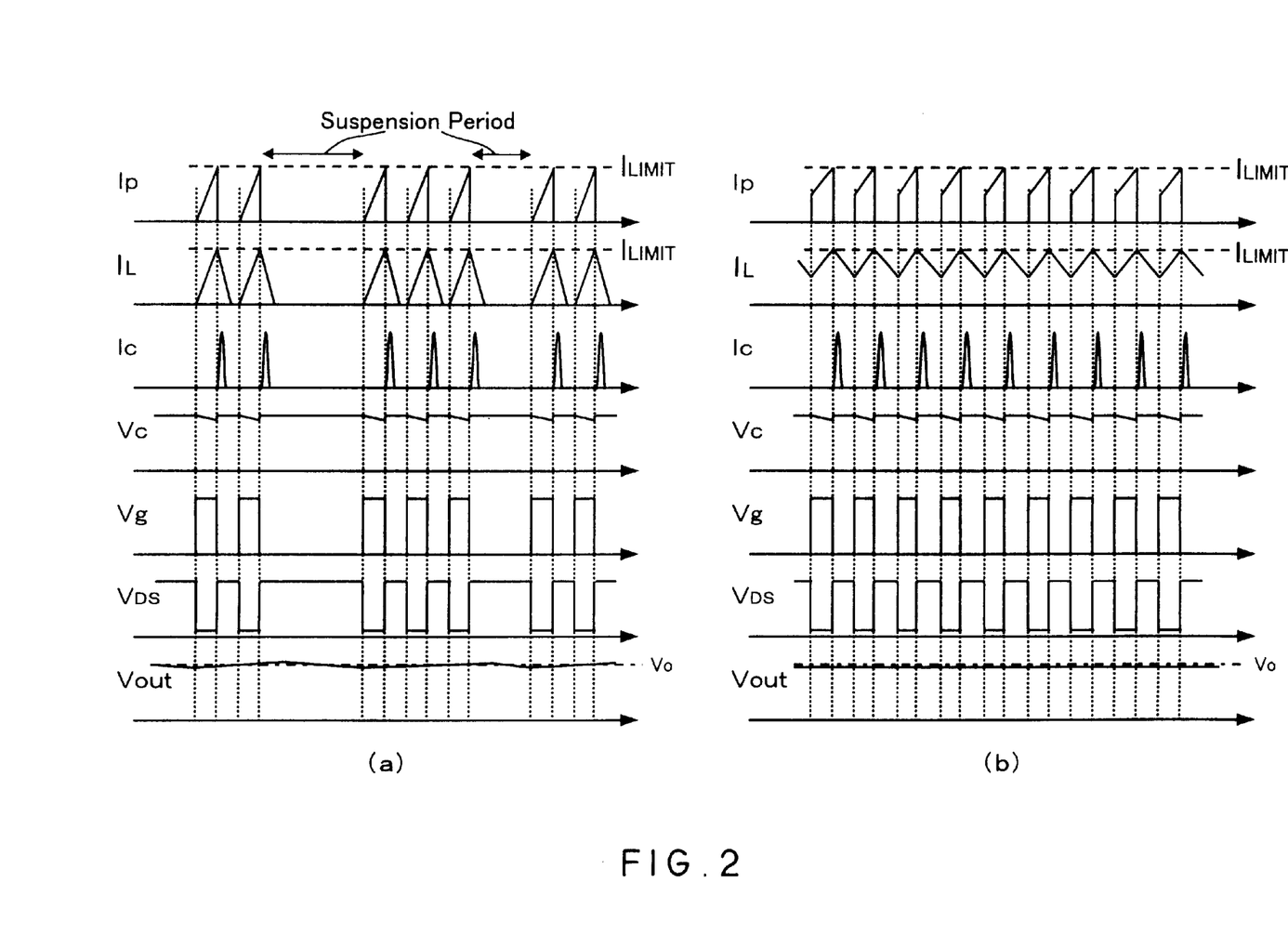
FIG. 2 shows operating waveforms at the respective parts of the switching power supply in FIG. 1.

First, a first DC voltage is applied to the input main terminal 6. When it reaches at least the starting voltage, a supply voltage for the control circuit is generated in the starting power supply block 13, starting a current supply to the capacitor for control circuit power supply 11 through the power supply switching block 12. Thus, the voltage Vc between both terminals of the capacitor 11 increases. At this time, the output main terminal 5 is at 0 V. When Vc reaches the voltage required for driving the control circuit 14, an output signal Vg as indicated in FIG. 2 having an ON duration Tg is transmitted to the gate terminal of the switching device 1 from the control circuit 14. Thus, the switching device 1 is in an intermittent ON/OFF state (i.e. an oscillating state). When the switching device 1 is ON, a current Ip flows into the coil 2 from the input main terminal 6. When the switching device 1 is turned OFF, no current is supplied from the input main terminal 6 to the coil 2, and an electric energy accumulated in the coil 2 is supplied to the output main terminal 5 through the regeneration diode 3. The regeneration diode 3 needs the same level of withstand pressure as the switching device 1, and the higher the rate of the recovery, the better the efficiency of voltage conversion. Thus, it is desired that Trr (inverse recovery time, inverse current time) is about 50 ns.

After applying a DC voltage to the input main terminal 6, the above-mentioned switching operation is repeated. When the voltage Vout of the input main terminal 5 is increased to reach at least a predetermined second VC voltage Vo, a signal is outputted from the output voltage detecting circuit 15. This signal causes the feedback circuit 17 to operate so that the state of the control circuit 14 changes from operating to paused (or stopped). When the state of the control circuit 14 is changed into paused (or stopped), the state of the switching device 1 changes from oscillating to paused (or stopped), so that the voltage Vout of the output main terminal is decreased. When Vout becomes less than Vo again, the output signal from the output voltage detecting circuit 15 is stopped, and the state of the control circuit 14 is changed from paused (or stopped) to operating again. Therefore, the state of the switching device 1 is changed from paused (or stopped) to oscillating again, and the voltage Vout of the output main terminal 5 is increased. Thus, the change in the voltage Vout of the output main terminal 5 (ripple voltage) is compared to the predetermined reference voltage Vo, so that the switching device 1 oscillates or is paused (or stopped).

The control circuit 14 is located at the high voltage side of the coil 2, and operates using the source terminal of the switching device 1, i.e. the terminal of the coil 2 at the high voltage side, as a reference voltage.

The operation of the feedback circuit 17 for changing the state of the control circuit 14 from operating to paused (or stopped) is as follows. The signal of the output voltage detecting circuit 15 causes the feedback circuit 17 to be ON or OFF When the feedback circuit 17 is ON, the potential difference between the input terminal of the control circuit 14 and the reference voltage of the control circuit 14 (i.e. the source potential of the switching device 1) is zero. Thus, oscillation of the control circuit 14 is paused (or stopped), and it is in a paused state (or stopped state). When the feedback circuit 17 is OFF, a potential difference is generated between the input terminal of the control circuit 14 and the reference voltage of the control circuit 14, so that the control circuit 14 is in an operating state.

In order to control the control circuit 14 to be in an operating state or in a paused (or stopped) state by the feedback circuit 17, two methods may be used, that is, methods using current control and voltage control. In the former method by current control, when a current flowing into the feedback circuit 17 is increased to be greater than a determined threshold, the feedback circuit 17 is switched ON. When it is decreased to be less than the threshold, the feedback circuit 17 is switched OFF Also, in the latter method by voltage control, when the voltage between both ends of the feedback circuit 17 is increased to be greater than a determined threshold, the feedback circuit 17 is switched OFF. When it is decreased to be lower than the threshold, the feedback circuit 17 is switched ON. The circuits for these two controls can be contained in the control circuit 14 or in the feedback circuit 17.

By repeating the above operation, the operation of the switching device 1 includes a period not subjected to the ON/OFF control, i.e. a paused (or stopped) period, in addition to the intermittent ON/OFF controlled period. The control circuit 14 controls the switching device 1 so that the voltage Vout of the output main terminal 5 is constant at Vo set as an output voltage. For such a control, in the control circuit 14, the paused (or stopped) period changes linearly with respect to the change in the state of the load connected to the output main terminal 5 (i.e. change in the output current or change in the output voltage). Thus, a good load characteristic is obtained.

FIG. 2 shows current/voltage waveforms at respective parts of the circuit in FIG. 1. The designations at the left of the waveforms of FIG. 2 correspond to those indicated for the respective parts in FIG. 1. FIG. 2(*a*) shows a discontinuous mode. The conditions with respect to the output current Io and the value L of the coil 2 in the discontinuous mode are expressed by the following inequalities (1) and (2), respectively $$Io < I_{LIMIT}/2, \tag{1}$$

$$(2 \times Vout \times Io)/(I_{LIMIT}^2 \times fc) < L < ((1 - Vout/Vin) \times Vout)/(I_{LIMIT} \times fc). \tag{2}$$

where Vin is an input voltage, Vout is an output voltage, fc is an oscillation frequency of the switching device 1, and $I_{LIMIT}$ is an overcurrent detection level.

FIG. 2(*b*) shows a continuous mode. In the same way, the conditions with respect to the output current Io and the value L of the coil 2 in the continuous mode are expressed by the following inequalities (3) and (4), respectively $$Io > I_{LIMIT}/2, \tag{3}$$

$$L > ((1 - Vout/Vin) \times Vout)/(2 \times (I_{LIMIT} - Io) \times fc). \tag{4}$$

By allowing the current (or voltage) level required to change the state of the control circuit 14 from operating to paused (or stopped) and the current (or voltage) level required to change the state of the control circuit 14 from paused (or stopped) to operating to have hysteresis, a stable paused (or stopped) state can be produced. There are three methods for this. The first method is to allow the control circuit 14 to have hysteresis. The second method is to allow the feedback circuit 17 to have hysteresis so as to control the control circuit 14. The third method is setting two specified voltages in the output voltage detecting circuit 15, and controlling the switching device 1 to be switched ON or OFF at these specified voltages.

Other embodiments of the present invention are described in the following. The basic principle of the operation of the circuits of the following embodiments is the same as that of the circuit of the first embodiment. Thus, the same elements as in FIG. 1 are denoted by the same reference numerals to avoid repeated explanation.

Figure 3:
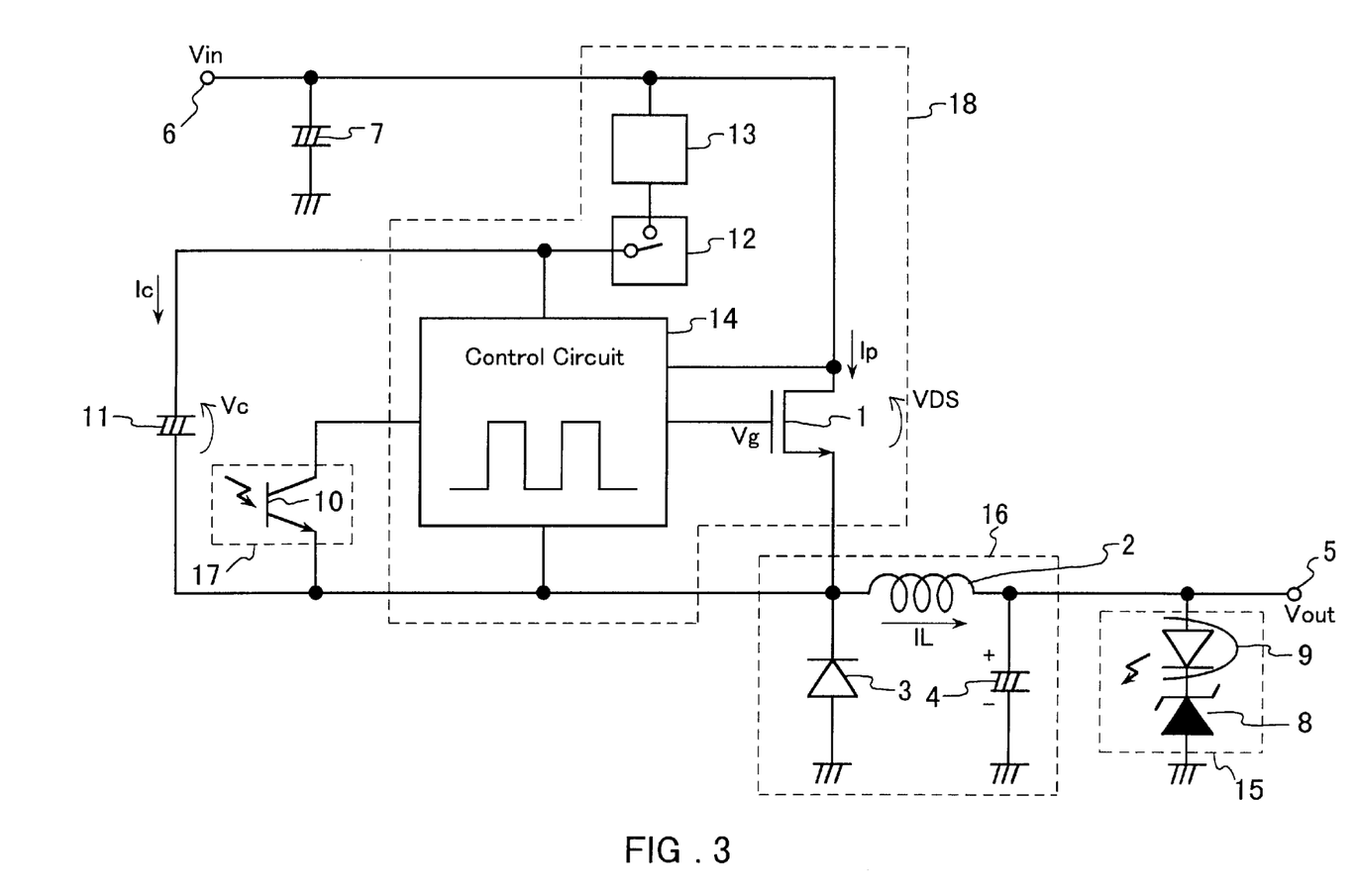
FIG. 3 is a circuit diagram showing a switching power supply of a second embodiment of the present invention.

FIG. 3 shows a switching power supply circuit of a second embodiment of the present invention. As shown in FIG. 3, the output voltage detecting circuit 15 comprises a Zener diode 8 and a light emitter element 9. The feedback circuit 17 comprises a switching element 10 with a photo detector. When the voltage at the output main terminal 5 exceeds the sum of the puncture voltage Vz of the Zener diode 8 and the forward voltage Vf of the light emitter element 9 (Vz+Vf), a current flows from the output main terminal 5 into the light emitter element 9 and the Zener diode 8, so that a current flows into the switching element 10 with a photo detector as the feedback circuit 17. Therefore, a signal according to the voltage at the output main terminal 5 is fedback to the control circuit 14, and a paused (or stopped) period is formed in the ON/OFF control over the switching device 1. That is, when a transistor constituting the switching element 10 is switched ON, and a current greater than a certain value flows, the switching device 1 is stopped. Furthermore, when the switching element 10 is OFF or the current is below a certain value, the switching device 1 starts oscillating. The operation with respect to the change in the state of the load of the output voltage is the same as that of the first embodiment.

The current/voltage waveforms at respective parts of the switching power supply in FIG. 3 in the discontinuous mode and the continuous mode are the same as those in FIG. 2. The conditions with respect to the output current Io and the value L of the coil 2 in the discontinuous mode and the continuous mode are also the same as the above inequalities (1) to (4).

Furthermore, in the second embodiment, by allowing the output voltage detecting circuit 15 and the feedback circuit 17 to comprise a photocoupler, which includes a light emitter element 9 and a switching element 10 with a photo detector, the number of parts of the circuit can be reduced.

Figure 4:
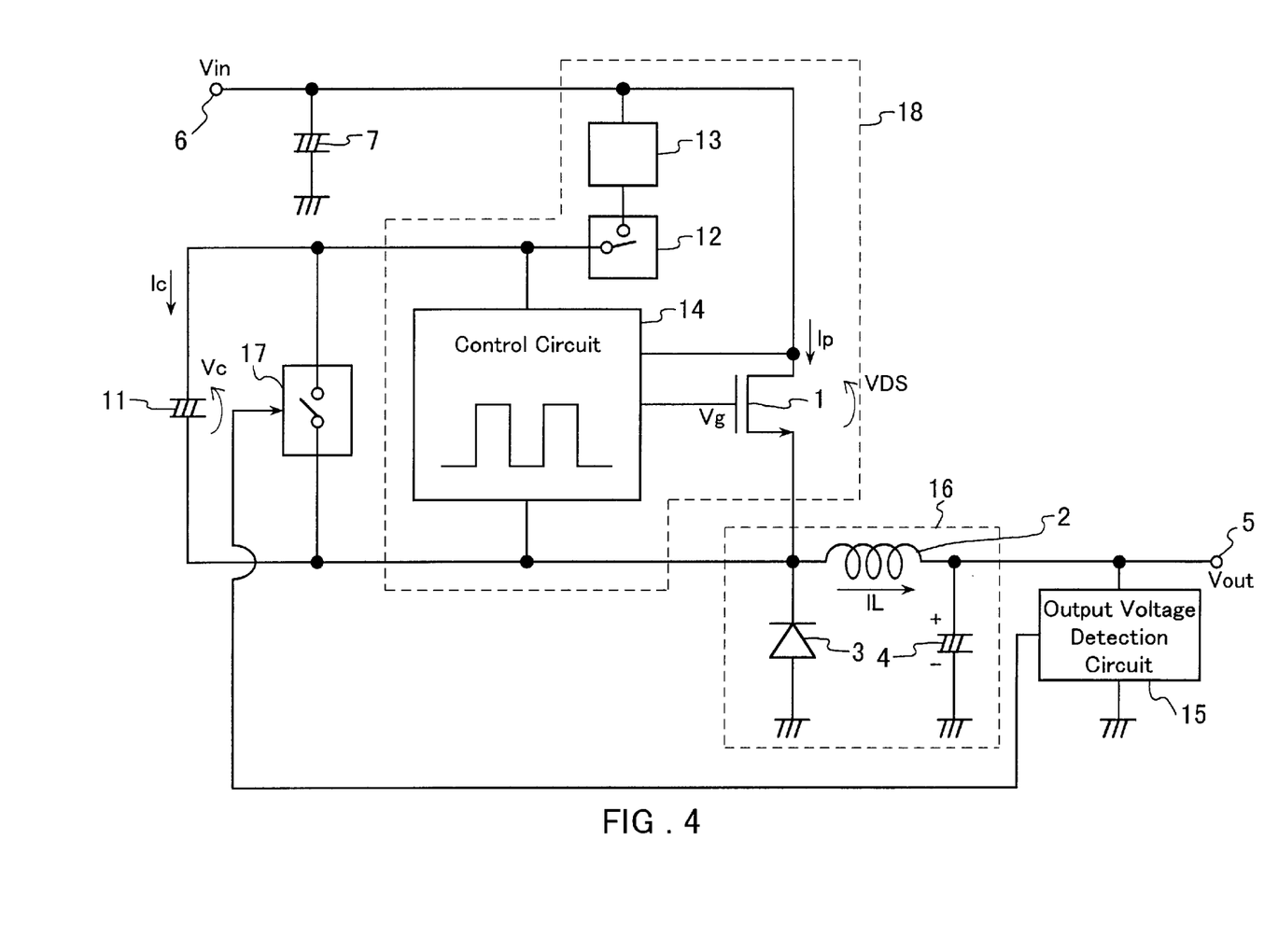
FIG. 4 is a circuit diagram showing a switching power supply of a third embodiment of the present invention.

FIG. 4 shows a switching power supply circuit of a third embodiment of the present invention. In this circuit, the feedback circuit 17 is connected in parallel to the capacitor for control circuit power supply 11 that is to be a power supply voltage of the control circuit 14. Its operation with respect to the change in the state of the load of the output voltage is the same as that in the first embodiment. In this case, when the feedback circuit 17 is ON according to an output signal of the output voltage detecting circuit 15, the supplied voltage of the control circuit 14 (the voltage between both terminals of the capacitor for control circuit power supply 11) is 0 V. This causes the operation of the control circuit 14 to stop, so that the switching device 1 is forced into OFF. Therefore, in this case, not only the switching device 1, but also the control circuit 14 is stopped, so that power consumption can be reduced more dramatically than in the case of the circuit of FIG. 1.

Figure 5:
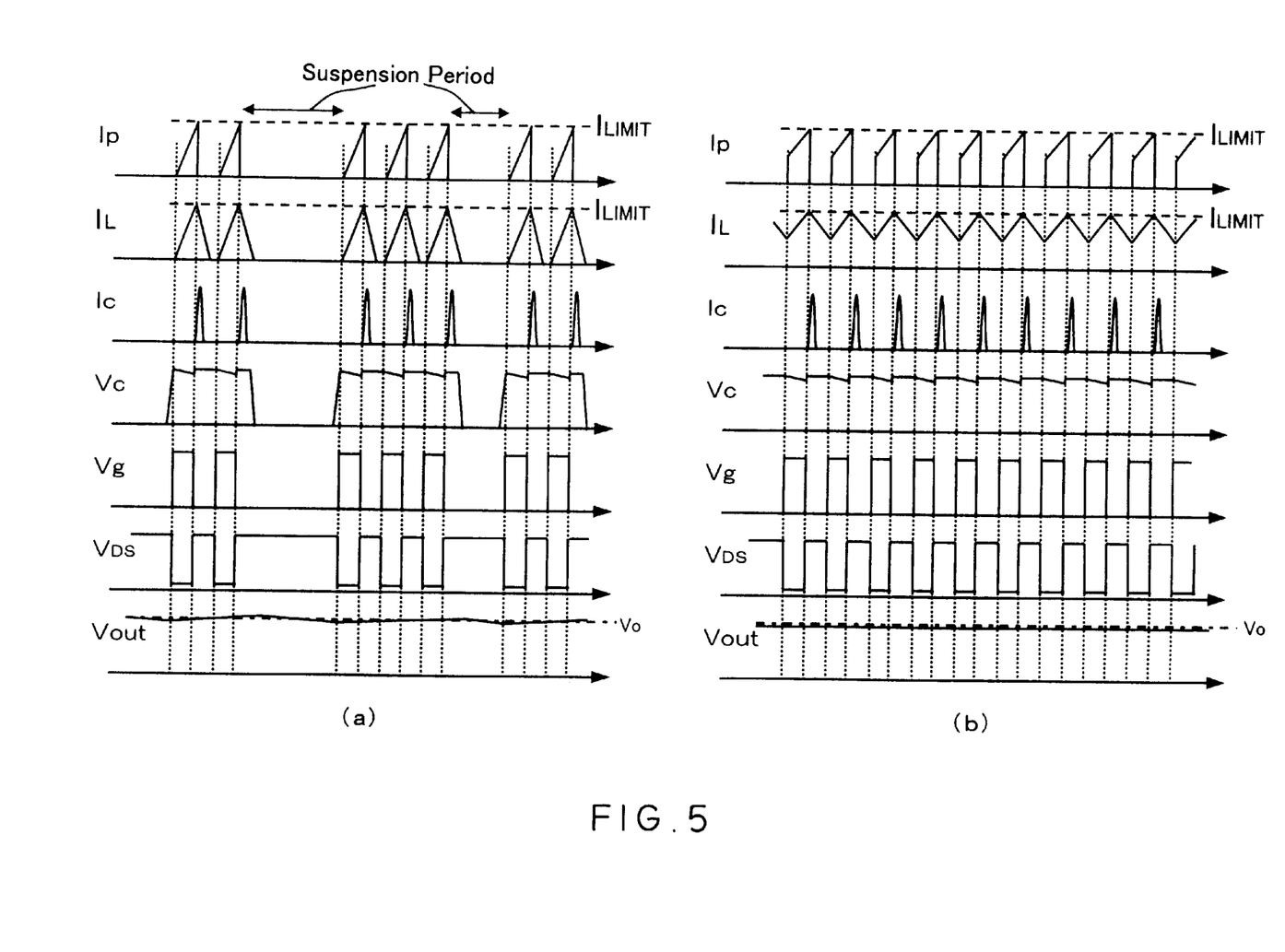
FIG. 5 shows operating waveforms at the respective parts of the switching power supply in FIG. 4.

FIG. 5 shows current/voltage waveforms at respective parts of the switching power supply circuit in FIG. 4. FIG. 5(*a*) shows a discontinuous mode, and FIG. 5(*b*) shows a continuous mode. The conditions with respect to the output current lo and the value L of the coil 2 in the discontinuous mode and in the continuous mode are the same as the above inequalities (1) to (4).

Figure 6:
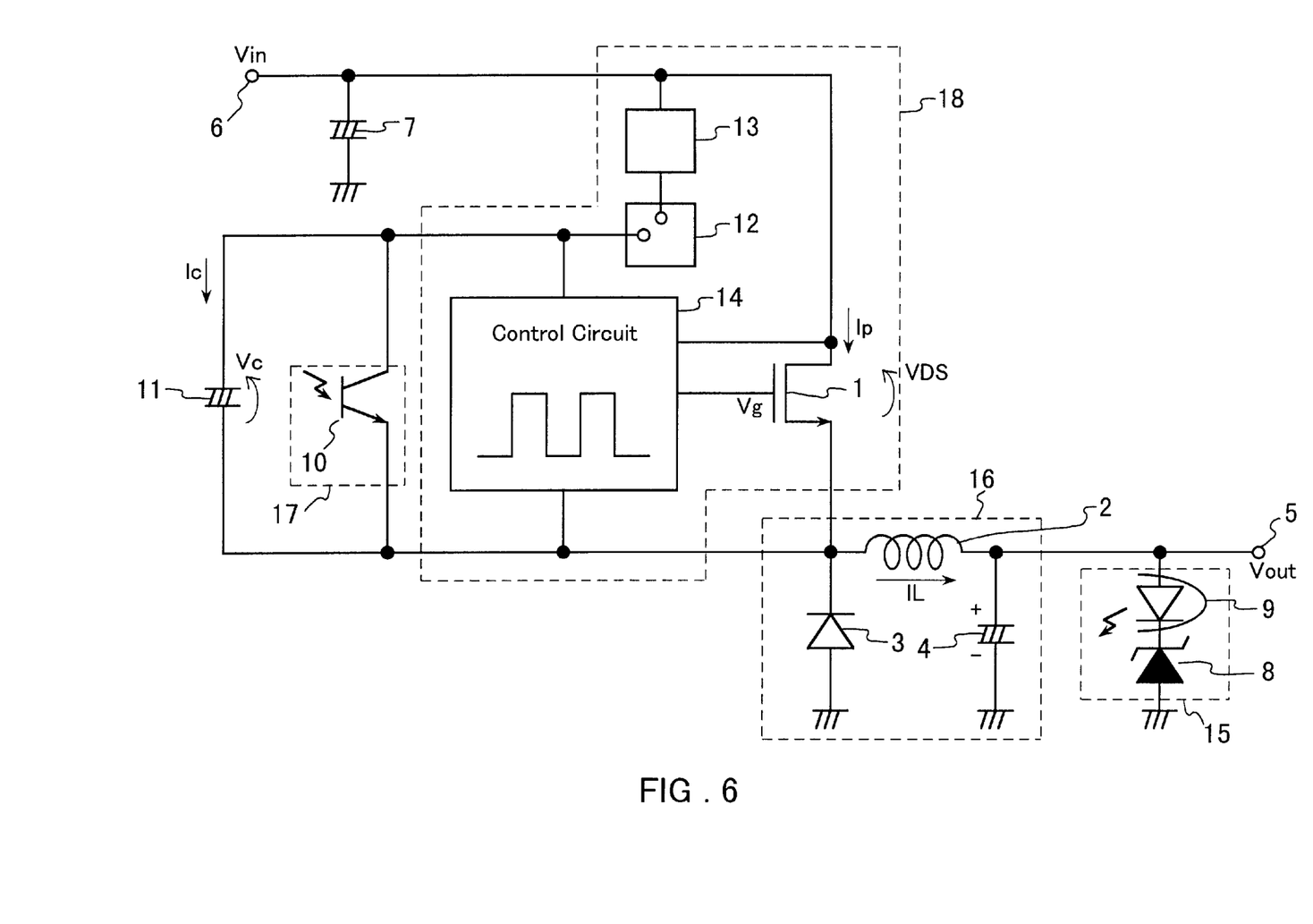
FIG. 6 is a circuit diagram showing a switching power supply of a fourth embodiment of the present invention.

FIG. 6 shows a switching power supply circuit of a fourth embodiment of the present invention. This circuit of FIG. 6 is a more specific example of the third embodiment (FIG. 4), and its operational principle is the same as that of the third embodiment. Moreover, its operation with respect to the change in the state of the load of the output voltage is also the same as that of the third embodiment. The output voltage detecting circuit 15 comprises a Zener diode 8 and a light emitter element 9, and the feedback circuit 17 comprises a switching element 10 with a photo detector.

The current/voltage waveforms at respective parts of the switching power supply in FIG. 6 in the discontinuous mode and in the continuous mode are the same as those in FIG. 5. The conditions with respect to the output current lo and the value L of the coil 2 in the discontinuous mode and in the continuous mode are also the same as the above inequalities (1) to (4).

Moreover, in the fourth embodiment, by using a photocoupler that incorporates the light emitter element 9 of the output voltage detecting circuit 15 and the switching element 10 with a photo detector as the feedback circuit 17, the number of parts of the circuit can be reduced.

Figure 7:
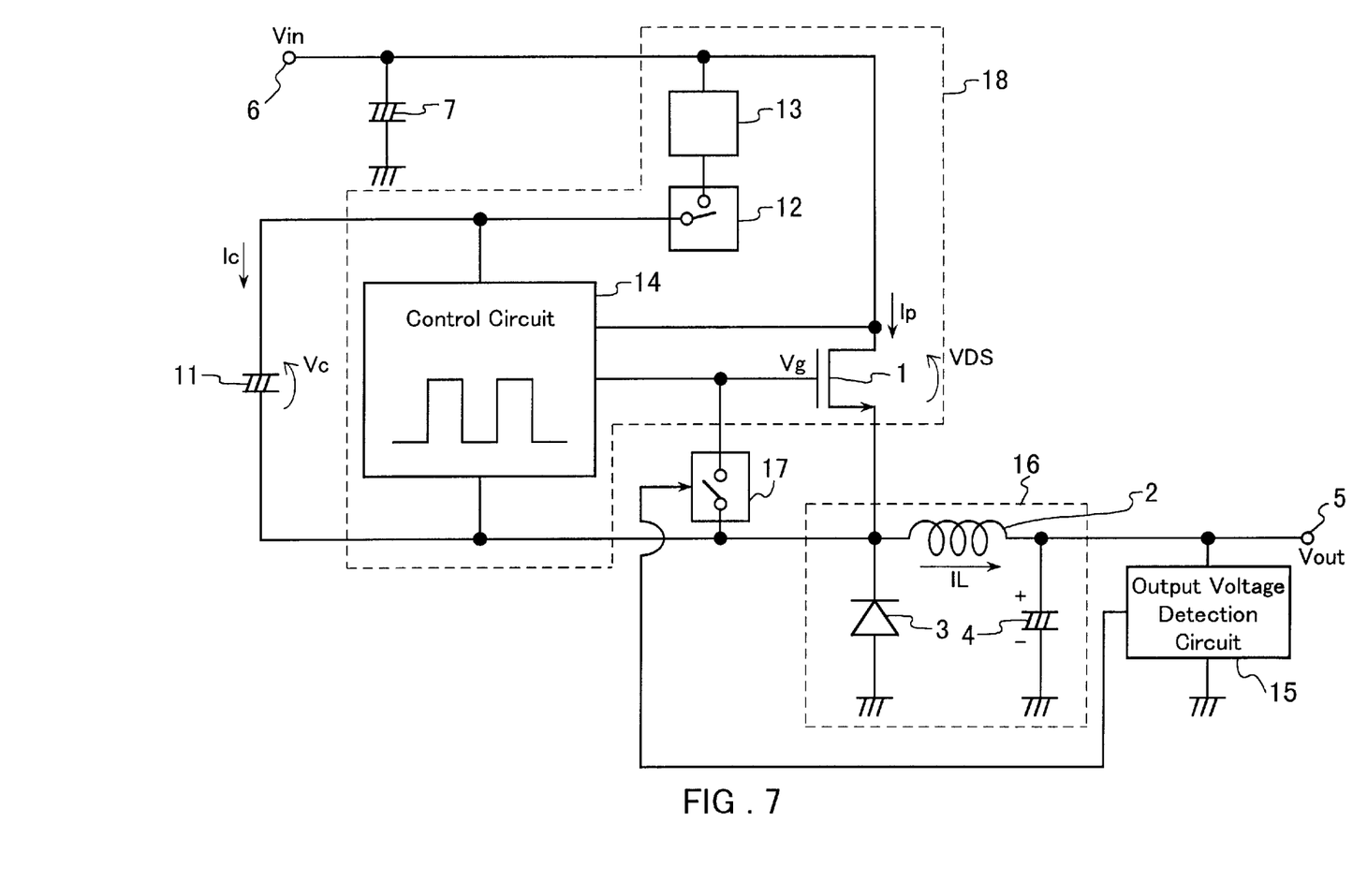
FIG. 7 is a circuit diagram showing a switching power supply of a fifth embodiment of the present invention.

FIG. 7 shows a switching power supply circuit of a fifth embodiment of the present invention. In this circuit, the feedback circuit 17 is connected to the gate terminal of the switching device 1. Thus, in this circuit, when the feedback circuit 17 is ON according to an output signal of the output voltage detecting circuit 15, the switching device 1 is forced into OFF, and its ON/OFF control over the switching device 1 is stopped.

The current/voltage waveforms at respective parts of the switching power supply in FIG. 7 in the discontinuous mode and in the continuous mode are the same as those in FIG. 2. The conditions with respect to the output current Io and the value L of the coil 2 in the discontinuous mode and the continuous mode are the same as the above inequalities (1) to (4).

Figure 8:
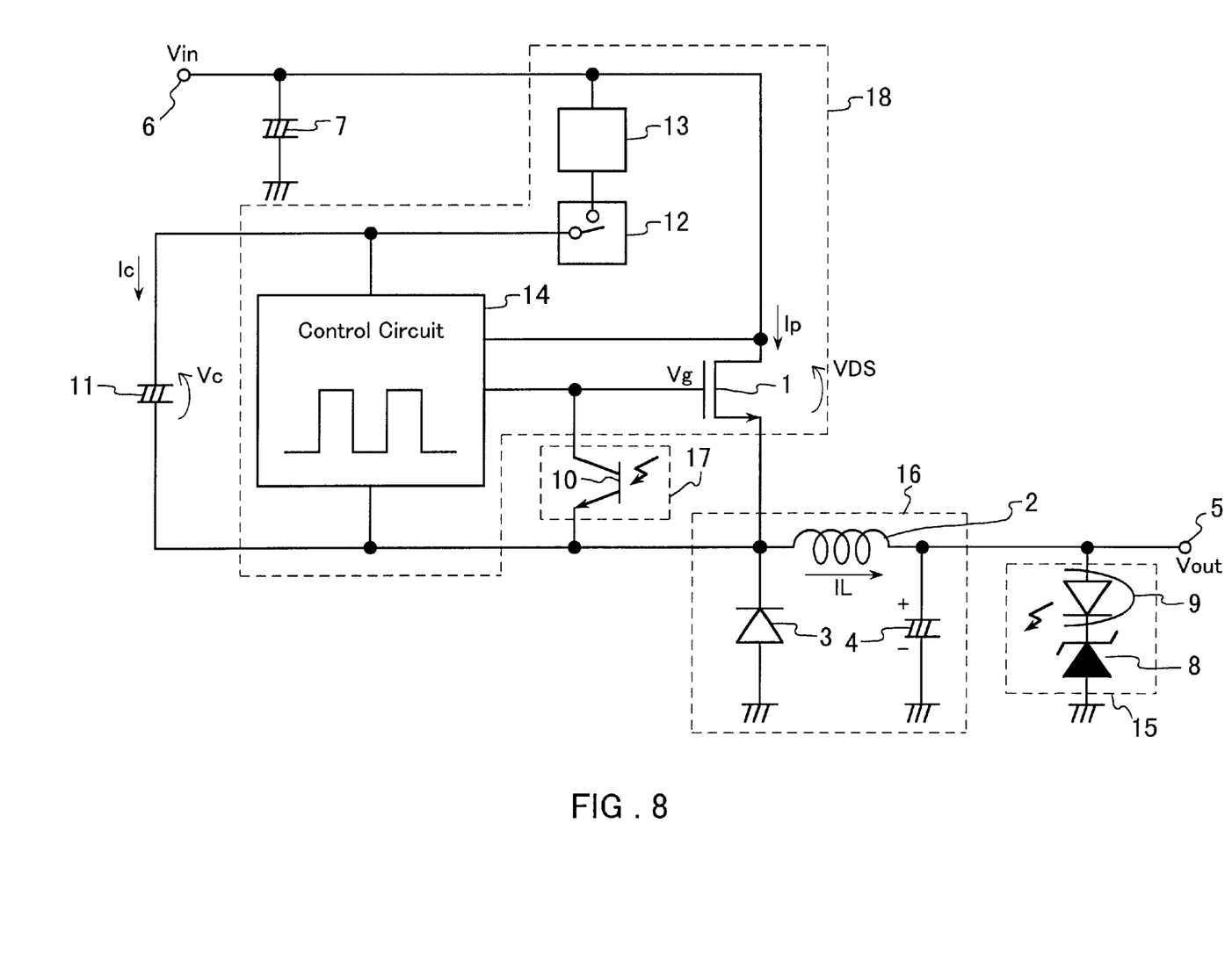
FIG. 8 is a circuit diagram showing a switching power supply of a sixth embodiment of the present invention.

FIG. 8 shows a switching power supply circuit of a sixth embodiment of the present invention. The circuit of FIG. 8 is a more specific example of the fifth embodiment (FIG. 7), and its operational principle is the same as that of the fifth embodiment. Moreover, its operation with respect to the change in the state of the load of the output voltage is also the same as that of the fifth embodiment. The output voltage detecting circuit 15 comprises a Zener diode 8 and a light emitter element 9, and the feedback circuit 17 comprises a switching element 10 with a photo detector.

The current/voltage waveforms at respective parts of the switching power supply in FIG. 8 in the discontinuous mode and the continuous mode are the same as those in FIG. 2. The conditions with respect to the output current Io and the value L of the coil 2 in the discontinuous mode and in the continuous mode are also the same as the above inequalities (1) to (4).

Figure 9:
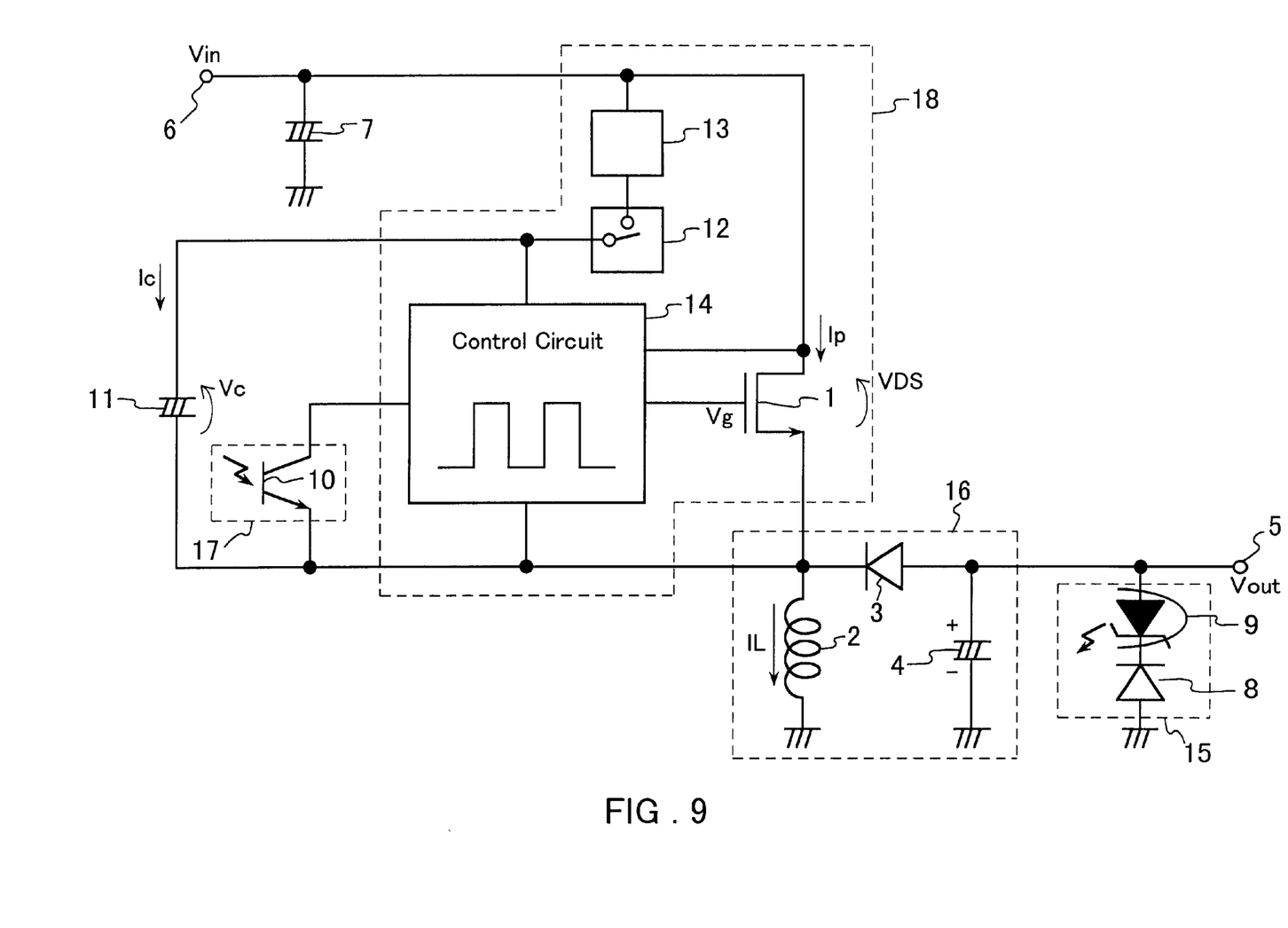
FIG. 9 is a circuit diagram showing a switching power supply of a seventh embodiment of the present invention.

The arrangement of the coil 2, the diode 3, and the output voltage detecting circuit 15 may be changed so that the polarity of the voltage outputted to the output main terminal 5 becomes negative. FIG. 9 shows a switching power supply circuit of a seventh embodiment of the present invention, in which the second embodiment in FIG. 3 (a specific example of the first embodiment) is converted into a cathodic voltage source. The arrangement of the coil 2, the diode 3, and the output voltage detecting circuit 15 also may be changed in other embodiments to produce a cathodic voltage source. By causing the polarity of the voltage outputted to the output main terminal 5 to be negative as in FIG. 9, the switching power supply of the present invention with equivalent anodic voltage source and basic circuit can be applied to an apparatus requiring a cathodic control voltage source.

Figure 10:
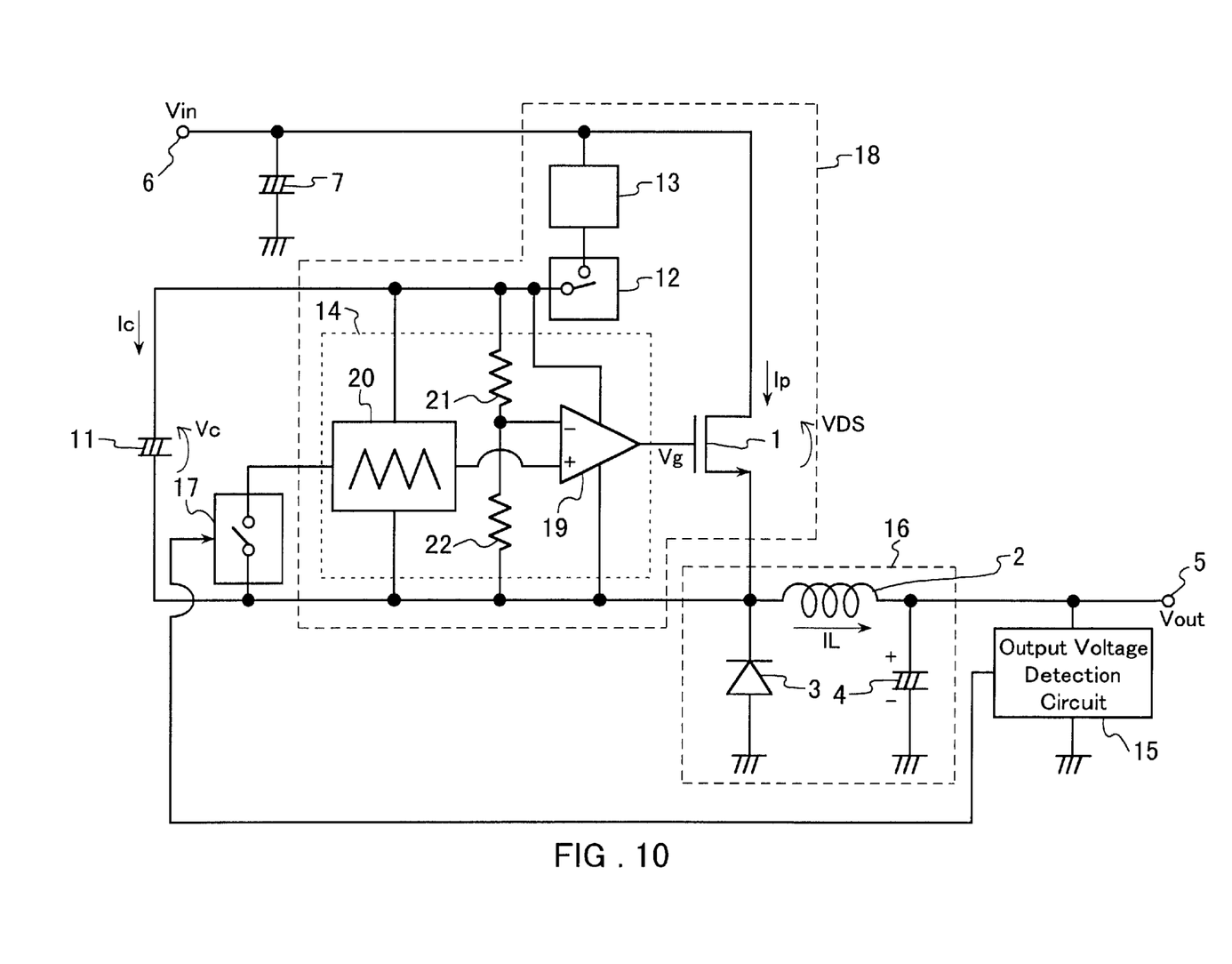
FIG. 10 is a circuit diagram showing a switching power supply of an eighth embodiment of the present invention.

FIG. 10 is a switching power supply circuit of an eighth embodiment of the present invention. Although its basic operation is the same as that of the embodiment in FIG. 1, this shows a specific structure of the control circuit 14. In this circuit, the triangular wave forming circuit 20 forms a triangular wave carrier signal at a constant frequency (e.g. 44 kHz). The triangular wave carrier signal voltage and the voltage obtained by dividing the voltage Vc by the resistors 21 and 22 (or power supply voltage Vc) are compared by a comparator 19, and inputted into the gate terminal of the switching device 1. As mentioned above, because the voltage Vc between both terminals of the capacitor for control circuit power supply 11 is kept constant by the power supply switching block 12, the period during which the switching device 1 can be ON may be varied by the split ratio of the resistors 21 and 22.

By using the above-described circuit structure, power consumption can be reduced considerably.

Although an n-channel MOS was used as the switching device 1 in the above-mentioned embodiments, the same effect can be obtained with an n-channel transistor such as n-channel IGBT or an NPN transistor.

Furthermore, in the above embodiments, the ON resistance of the switching device 1 was used as an overcurrent level detecting resistance for overcurrent protection by using a detecting terminal connected to the input main terminal of the switching device 1. However, this detecting terminal may be omitted, and an overcurrent protection circuit in which voltage-dropping elements such as resistors are connected in serial between the blocks of the input main terminal 6, the switching device 1, the coil 2, and the output main terminal 5, and their resistance is allowed to be a detecting resistance, may be added. Moreover, circuit blocks for overload protection and high temperature protection of the switching device also may be added.

Furthermore, the elements as indicated by numeral 18 in FIGS. 1, 3, 4, 6, 7, 8, 9 and 10, that is, the switching device 1, the control circuit 14, the power supply switching block 12, and the starting power supply block 13, may be integrated on the same semiconductor substrate. At this time, at least four terminals, including two main terminals of the switching device 1 (i.e. source terminal and drain terminal), a terminal for connecting the capacitor for control circuit power supply 11 that is to be a power supply voltage of the control circuit 14, and a terminal for connecting the feedback circuit 17 that is controlled by the output voltage detecting circuit 15, are integrated as external connecting terminals. By incorporating them into a package with at least four terminals, the number of parts can be reduced considerably, the sizes of parts are decreased, and a power supply with a smaller size and lower cost can be obtained. Moreover, even if the power supply switching block 12 and the starting power supply block 13 are excluded from the above-mentioned elements to be packaged, useful effects of reduced size and cost reduction can be achieved.

As described above, a switching power supply of a step-down chopper system with substantially reduced power consumption can be obtained according to the present invention.

Furthermore, in a switching power supply of a step-down chopper system of low output that does not require a high output, oscillation frequency can be decreased. Thus, by using the switching power supply of the present invention, it is possible to reduce power consumption and improve efficiency. Particularly, remarkable effects are obtained for reduced power consumption and improved efficiency in a power supply for a control circuit of an electrical apparatus with an output voltage of 5 W or less, which operates with commercial AC input voltage 100 Volts and 200 Volts, in which a commutated voltage (100 to 400 V) is inputted to the output main terminal as the first DC voltage, and a voltage of 25 V or lower is outputted from the output main terminal as the second DC voltage.

Furthermore, the output voltage of the switching power supply of a stepdown chopper system of the present invention is determined basically by the output voltage detecting circuit. For example, in an embodiment using a Zener diode in the output voltage detecting circuit, the output voltage is determined basically by the puncture voltage of the Zener diode in the output voltage detecting circuit. Therefore, the output voltage can be set or changed easily, and ease of use like a linear regulator can be attained.

Moreover, the output voltage of the switching power supply of a step-down chopper system of the present invention can be adapted for both an anodic voltage source and a cathodic voltage source with basically the same circuit structure.

Furthermore, in a switching power supply in which a DC voltage of 100 V or greater is converted into a DC voltage of 25 V or lower, significant effects are obtained for cost reduction, size reduction, and improved performance.

Furthermore, by integrating the switching device, the control circuit, the power supply switching block, and the power supply for starting on the same semiconductor substrate, a power supply with smaller size and lower cost can be obtained.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A switching power supply comprising:
    a switching device having an input terminal, an output terminal and a control terminal, which turns ON/OFF a first DC voltage supplied to the input terminal through an input main terminal, and outputs it to the output terminal;
    a control circuit comprising an output signal terminal connected to the control terminal of the switching device, an input signal terminal connected to an output terminal of a feedback circuit, the control circuit outputting a signal from the output signal terminal for controlling an intermittent ON/OFF operation of the switching device at a constant period;
    a conversion circuit connected to the output terminal of the switching device, which converts an output voltage turned ON/OFF by the switching device into a second DC voltage, whose absolute value is less than that of the first DC voltage, and outputs it to an output main terminal;
    an output voltage detecting circuit connected to the output main terminal and generating a detection signal when a voltage at the output main terminal is more than a predetermined value; and
    the feedback circuit connected to the output voltage detecting circuit, and supplies a signal to the input signal terminal of the control circuit when receiving the detection signal;
    wherein an intermittent ON/OFF operation of the switching device at a constant period in an oscillating state controlled by the signal supplied from the control circuit is paused or stopped when the signal is supplied from the feedback circuit, so that a length of period of the pause or stop is changed according to the voltage at the output main terminal.

2. The switching power supply according to claim 1, wherein the control circuit uses a reference voltage at a side that has a voltage higher than a reference voltage of the second DC voltage, and the output voltage detecting circuit detects the second DC voltage so as to control the feedback circuit.

3. The switching power supply according to claim 1, wherein the output voltage detecting circuit comprises a serial circuit comprising a Zener diode and a light emitter element.

4. The switching power supply according to claim 1, wherein the feedback circuit comprises a switching element comprising a photo detector.

5. The switching power supply according to claim 1, wherein the output voltage detecting circuit and the feedback circuit comprise a Zener diode and a photocoupler.

6. The switching power supply according to claim 1, wherein the first DC voltage to be inputted is not lower than 100 V, and the second DC voltage to be outputted is not greater than 25 V.

7. The switching power supply according to claim 1, wherein the switching device and the control circuit are integrated on a same semiconductor substrate, and incorporated into a package with at least four terminals, using at least four terminals including the input terminal and the output terminal of the switching device, a terminal for connecting a capacitor for control circuit power supply, and a terminal for connecting the feedback circuit, as external connecting terminals.

8. The switching power supply according to claim 1, wherein the control circuit has a detecting terminal connected to the input terminal of the switching device.

9. The switching power supply according to claim 1, further comprising overcurrent protection means.

10. The switching power supply according to claim 1, further comprising overcurrent protection means and high temperature protection means.

* * * * *